United States Patent [19]
Walter

[11] Patent Number: 6,082,308
[45] Date of Patent: Jul. 4, 2000

[54] ANIMAL RESTRAINING DEVICE

[76] Inventor: Glen Vail Walter, 31 Olde Farm Rd., Boxford, Mass. 01921

[21] Appl. No.: 09/337,124

[22] Filed: Jun. 21, 1999

[51] Int. Cl.[7] .................................................. A01K 27/00
[52] U.S. Cl. ............................................................ 119/769
[58] Field of Search ...................... 119/712, 769, 119/770, 792, 793, 795, 797, 798, 801, 802, 856; 2/310, 312, 338, 232, 233

[56] References Cited

U.S. PATENT DOCUMENTS

| | | | |
|---|---|---|---|
| D. 339,885 | 9/1993 | Rebek | D30/163 |
| 2,250,171 | 7/1941 | Wilkins | 242/98 |
| 3,477,410 | 11/1969 | Lettieri | 119/109 |
| 3,935,443 | 1/1976 | Simmons | 240/6.4 W |
| 4,513,692 | 4/1985 | Kuhnsman et al. | 119/109 |
| 4,887,552 | 12/1989 | Hayden | 119/109 |
| 4,903,638 | 2/1990 | Lacey | 119/114 |
| 5,247,906 | 9/1993 | Stevenson | 119/795 |
| 5,497,732 | 3/1996 | Moffre et al. | 119/784 |
| 5,511,293 | 4/1996 | Hubbard, Jr. et al. | 119/797 |
| 5,555,848 | 9/1996 | Trujillo et al. | 119/856 |
| 5,558,044 | 9/1996 | Nasser, Jr. et al. | 119/796 |
| 5,611,298 | 3/1997 | Sporn | 119/792 |
| 5,699,555 | 12/1997 | Schunter | 118/857 |
| 5,724,921 | 3/1998 | Bell | 119/795 |
| 5,732,662 | 3/1998 | Jacobsen | 119/798 |
| 5,816,198 | 10/1998 | Peterson | 119/794 |
| 5,860,198 | 1/1999 | Buntin, Jr. | 24/600.5 |
| 5,913,285 | 6/1999 | Pritchard | 119/771 |
| 5,950,569 | 9/1999 | Perrulli | 119/770 |

*Primary Examiner*—Thomas Price
*Attorney, Agent, or Firm*—Lahive & Cockfield, LLP

[57] ABSTRACT

The present invention provides a leash for controlling an animal. The leash of the invention includes a sleeve portion having a loop portion that can form a cuff around a user's wrist, and a gripping portion that is held in the palm of the user's hand. Both the loop portion and the gripping portion are formed at least partially of a soft fabric-like material to prevent abrasion of the user's skin.

38 Claims, 11 Drawing Sheets

ANIMAL RESTRAINING DEVICE

BACKGROUND OF THE INVENTION

This invention relates generally to an animal restraining device. In particular, the invention relates to a pet leash having an ergonomic design.

Pet owners are typically either required to keep their pets on a leash when in public, or to hold and/or to control their pets. For example, a dog owner may use a leash to control the dog while walking. The leash is typically strong enough to secure the animal to the owner. Many conventional leashes have handles that are simply a loop made of a coarse rope or webbing. Such a coarse rope or webbing can cause abrasions of the pet owner's skin, and further can restrict blood circulation by exerting excessive pressure on the wrist.

Leashes having soft handles are also known in the art. Such leashes typically include a single loop made of a soft material that is connected to one end of a rope or webbing, the other end of which is attached to the pet. The pet owner can hold the loop itself or may place the loop around her wrist and grab a portion of the rope by her hand to hold and/or control the animal. The rope or webbing of such a leash is typically formed of a coarse material that can cause abrasions of the skin if tightly held. This is particularly disadvantageous when the animal pulls hard on the leash, and the owner has to exert extra force on the rope to restrain the animal. Further, an owner who is wearing the loop around the wrist typically needs to bend the wrist to hold the rope. This puts strain on the wrist, which can cause discomfort especially if the leash needs to be held for a relatively long time. In addition, holding the loop itself is not comfortable and can cause strain on the wrist, and further may not allow the degree of control needed for restraining the pet.

Accordingly, it is an object of the present invention to provide an animal restraining device that can be comfortably used by a pet owner.

It is another object of the present invention to provide a leash for restraining a pet that does not cause abrasions of the pet owner's skin when tightly held.

It yet another object of the present invention to provide a leash for restraining a pet without unduly restricting blood flow through the wrist of the pet's handler.

It is another object of the present invention to provide a collar to be disposed about a pet and attached to a leash that distributes a load from the leash substantially evenly about the pet.

SUMMARY OF THE INVENTION

The present invention provides a leash for restraining an animal that includes a sleeve portion that is sized and dimensioned to mount about the wrist of the animal handler. The sleeve portion includes a loop portion and a gripping portion. The loop portion and the gripping portion are at least partially formed of a soft fabric-like material. The term 'soft fabric-like material' as used herein refers to a material formed of a soft fabric having a pile or napped surface, such as Velour, fur, suede, fleece, brushed tricot, or felt that is soft to the touch. The fabric-like material can also be resilient and have a substantial spring-back resistance or quality such that the material returns to its original shape or position after being depressed. The soft fabric-like material is chosen such that it can be tightly held by a handler of an animal attached to the leash without digging into the handler's skin and/or causing abrasions of the skin. The leash of the invention further includes a lead member that is attached to the gripping portion at its proximal end, and can be connected to the animal at its distal end. The lead member is preferably integral with the sleeve portion.

According to one aspect of the invention, the loop portion of the sleeve portion forms an oblique angle with the gripping portion. The oblique angle is preferably selected to be in the range from between about 90 degrees to about 135 degrees. More preferably, the angle is selected to be about 105 degrees. The oblique angle advantageously allows a pet handler to hold the gripping portion in the palm of the hand tightly with the loop portion positioned about the wrist, without having to substantially bend the wrist.

In one aspect of the invention, the loop portion is formed of an inner surface attached to an outer surface, for example, through stitching an outer perimeter of the surfaces together to form a tubular-like structure. The inner and outer surfaces can be formed of the same or different materials. If the surfaces are formed of the same material, it is possible to form the tubular-like structure by folding a piece of the material to put two of its edges adjacent to each other, and sewing the edges together to form a seam. In a preferred embodiment of the invention, the inner surface is formed of the soft fabric-like material, preferably Velour, and the outer surface is formed of a synthetic polyamide material, such as Nylon. Alternatively, the outer surface can be formed of other materials such as twill, denim, or duck fabric.

According to another aspect of the invention, a fastener, such as a snap-in button, elastic connector, or a loop and hook arrangement, such as Velcro, placed at a portion of the sleeve intermediate the loop portion and the gripping portion can be fastened to form a wrist cuff from the loop portion. The inner surface of the loop portion which is selected to be of a soft material forms the inner surface of the wrist cuff. If the fastener is a snap-in button or Velcro, the pet handler can first slip the loop portion over her wrist, and subsequently join the ends of the loop portion together by fastening the fastener. In an alternative embodiment of the invention, two ends of the loop portion are stitched together to form a permanent wrist cuff, i.e., a cuff whose ends can not be easily disengaged form each other. In yet another embodiment of the invention, the fastener is selected to be an elastic connector that allows expansion of the wrist cuff to be slipped over the handler's hand and be placed about the handler's wrist, and further secures the wrist cuff snugly about the handler's wrist.

Another aspect of the invention relates to the gripping portion having two side members, where each member is formed of an outer surface joined to an inner surface to create a tubular-like structure, for example by stitching the outer perimeters of the surfaces together. The term 'outer surface' as used in relation to the gripping portion refers to the surface that contacts the hand, and the term 'inner surface' refers to a surface disposed on the opposite side of the outer surface. In one preferred embodiment of the leash of the invention, the outer surface of each of the two side members of the gripping portion forms a contiguous surface with the inner surface of the loop portion, and the inner surface of each of the two side members of the gripping portion forms a contiguous surface with the outer surface of the loop portion.

The outer and inner surfaces of the side members of the gripping portion can be formed of the same or different materials. In one preferred practice of the invention, the outer surfaces of these members are formed of Velour, and the inner surfaces are formed of Nylon.

According to another aspect of the invention, a padding, preferably a resilient foam-like or 'batting' material, such as heavy polyester felting or Neoprene, is disposed between the inner and outer surfaces of the loop portion, and also between the inner and outer surfaces of the members of the gripping portion. The term 'foam-like material' as used herein refers to a material that is soft and resilient and has a spring-like quality that allows it to return to its original shape after being depressed. Such a foam-like material advantageously provides extra cushion when a pet handler holds the gripping portion tightly with the loop portion pressing against the wrist.

In one aspect of the invention, the elongate lead is a flexible strap formed of woven Nylon, or a cotton rope, or a Nylon rope, or leather. The flexible strap can include a loop at its proximal end that runs between the inner and outer surfaces of the loop portion and between the inner and outer surfaces of the side members of the gripping portion. The disposition of the flexible strap between the inner and outer surfaces of the loop portion and of the gripping portion advantageously provides additional structural support for these portions. Alternatively, the elongate lead can be a metal chain or cord.

Another aspect of the invention relates to a pocket that can be formed between the inner and the outer surfaces of the loop portion. The pocket allows a pet handler to conveniently carry small items such as keys, dog biscuits, etc. The pocket is preferably positioned such that it can be easily accessed when the loop portion is placed around the handler's wrist. Further, the leash of the invention can optionally include a hanging loop for storing the leash, for example by hanging the leash from a hook.

Another aspect of the invention relates to providing a handle for a leash having a sleeve portion that is sized and dimensioned for mounting about the wrist of a pet handler. The sleeve portion includes a loop portion that is at least partially formed of a soft fabric-like material, such as Velour, and a gripping portion which is also at least partially formed of the soft fabric-like material and is integral with the loop portion.

In one preferred practice of the invention, the gripping portion and the loop portion of the handle form an oblique angle with respect to each other. This oblique angle is preferably selected to be in the range from between about 90 degrees to about 135 degrees, and more preferably, is selected to be about 105 degrees.

Another aspect of the present invention relates to a collar for disposing about an animal that includes a substantially circular inner collar portion that is sized and dimensioned to be disposed about the animal. The inner collar portion preferably includes an adjustable buckle that allows adjusting the size of the inner collar portion for a given pet. A padding portion is positioned about the outer surface of the inner collar portion. Further, an inner fabric portion, secured to the padding portion, covers at least partially the inner surface of the inner collar portion. The collar of the invention further includes a load-carrying member that forms a loop around the inner collar portion and is configured for attachment to a leash.

These and other features and advantages of the present invention will be more fully understood by reference to the following detailed description of the invention in conjunction with the attached drawings in which like numerals refer to like elements through different views.

DESCRIPTION OF ILLUSTRATED EMBODIMENT

Figure 1:
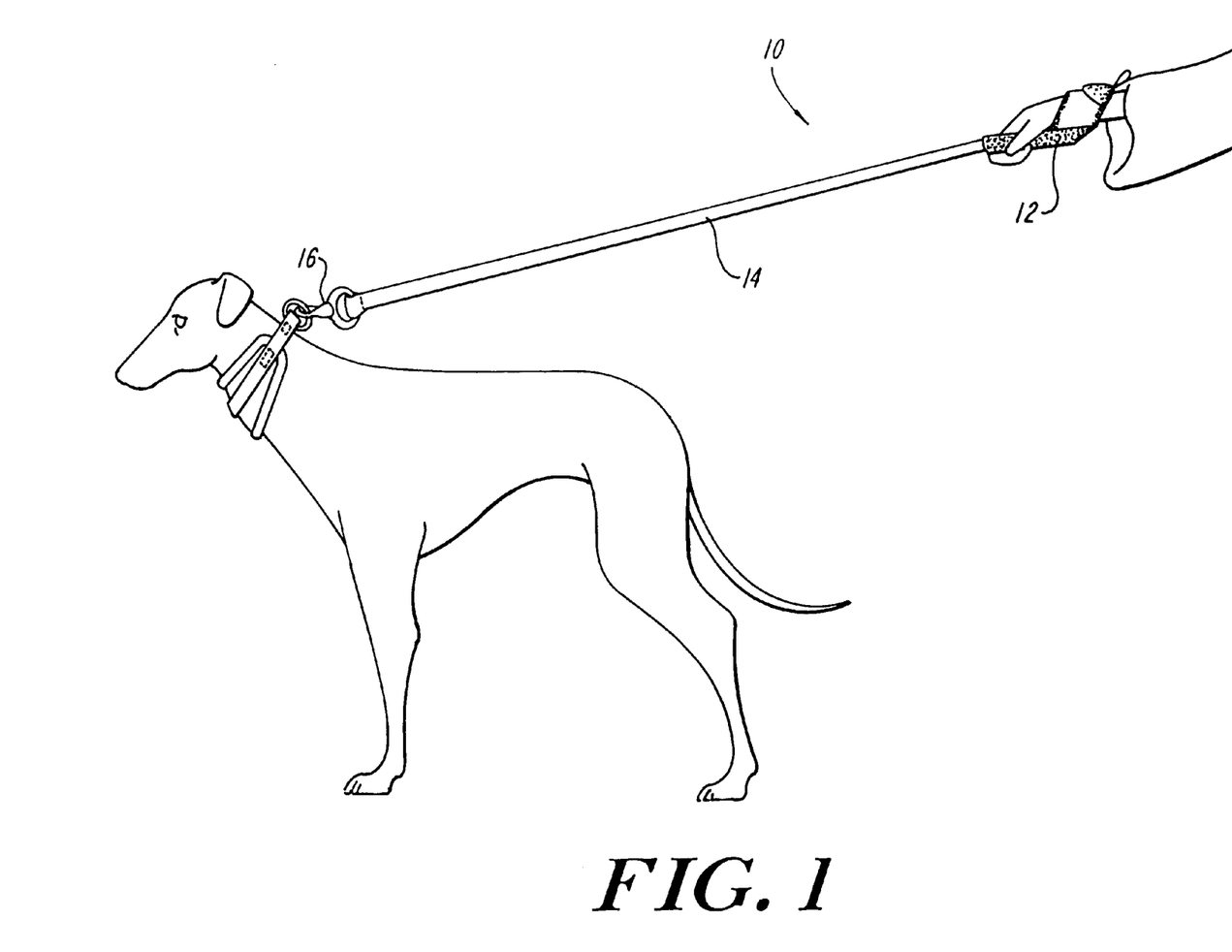
FIG. 1 is a perspective view of a leash attached to a dog according to the teachings of the present invention.

FIG. 1 illustrates an exemplary embodiment of a pet leash 10 according to the present invention, which in use is attached at one end to a pet, such as a dog, and is held at its other end by the pet's handler. The pet leash 10 includes a sleeve portion 12 that is attached to a proximal end of an elongate flexible strap 14, the distal end of which is connected to a clip 16 for attachment to a collar around the pet's neck.

Figure 2A:
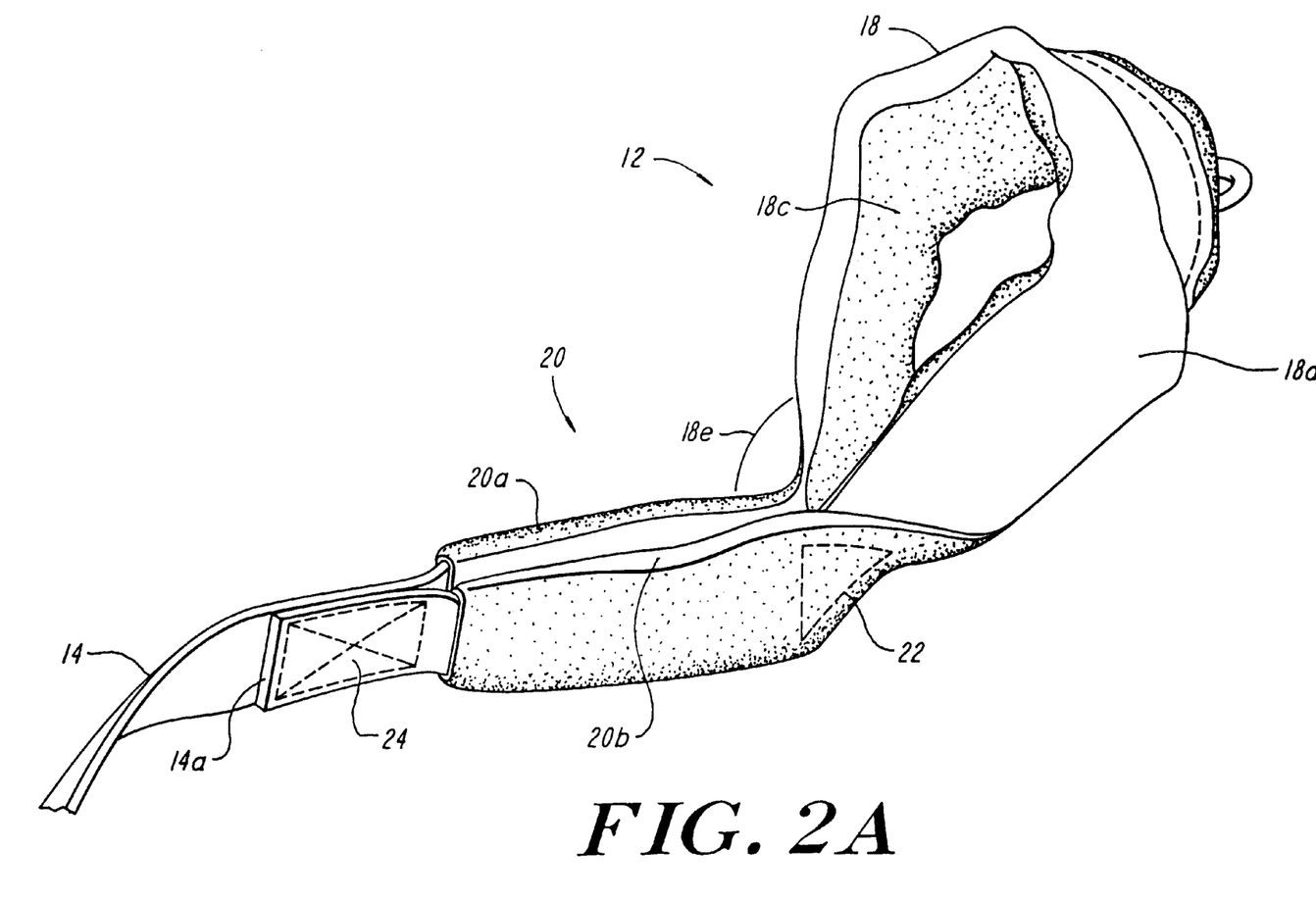
FIG. 2A is a partial perspective view of the leash according to the teachings of the present invention.
Figure 2B:
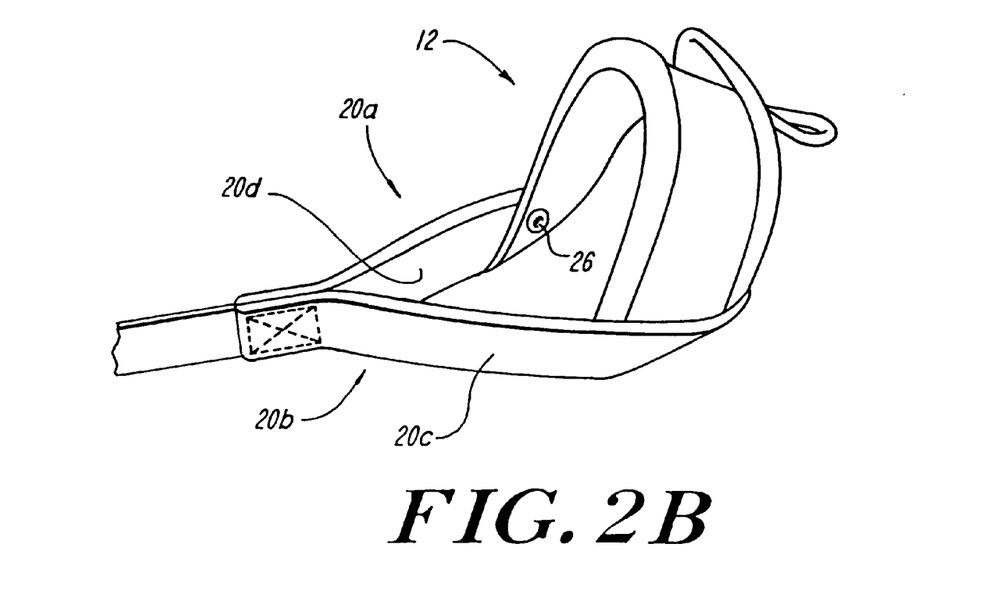
FIG. 2B is a perspective view of a loop portion of the leash of FIG. 2A according to the teachings of the present invention illustrating a fastener for forming a wrist cuff from the loop portion of the leash.

FIGS. 2A and 2B illustrate that the sleeve portion 12 includes a loop portion 18 extending and coupled to a gripping portion 20. The portions 18 and 20 form an oblique angle therebetween. The illustrated loop portion 18 and the gripping portion 20 can form a single unitary piece. Further, the illustrated angle 18e is preferably chosen to be approximately 105 degrees. The loop portion 18 includes an inner surface 18c and an outer surface 18d, which are joined together to create a tubular-like structure. The inner surface 18c is preferably formed of a soft fabric-like material, such as Velour, felt, suede, fleece, or brushed tricot, and the outer surface 18d is preferably formed of Nylon, or cotton canvas, or leather, or twill, or denim, or duck fabric.

The illustrated gripping portion 20 includes two side members 20a and 20b. Reference to FIGS. 2A and 2B illustrates that the side member 20b of the gripping portion 20 includes an outer surface 20c that is formed of a soft fabric-like material and is contiguous with the inner surface 18c of the loop portion 18, and an inner surface 20d that is preferably formed of a synthetic material and is contiguous with the outer surface 18d of the loop portion 18. A stitch pattern 22 between an end of the side member 20b and an end of the loop portion 18 ensures that the outer surface 20c of the side member 20b is the surface that contacts the palm of the pet handler's hand. Similarly, the side member 20a of the gripping portion 20 includes an inner surface 20d that is preferably formed of Nylon and is contiguous with the outer surface 18d of the sleeve portion 18, and an outer surface (not shown), opposite the inner surface 20d, that is preferably formed of Velour and is contiguous with the inner surface 18c of the sleeve portion 18. A stitch pattern (not shown) similar to the stitch pattern 22 ensures that the outer surface of the side member 20a, which is formed of a soft fabric-like material, contacts the palm of a handler's hand.

A portion of the strap 14 runs through the space formed between the inner and outer surfaces of the side members 20a and 20b of the gripping portion 20 and of the loop portion 18. In addition, a foam-like material (not shown), such as heavy polyester felting or Neoprene, is disposed between the inner and outer surfaces of the loop portion 18 and the gripping portion 20. The foam-like material provides a selected amount of additional resiliency to the sleeve portion 12, which is capable of springing back or returning to its original shape. Hence, the combination of the foam-like material and the fabric-like material form a relatively soft, resilient sleeve portion that generally retains its shape after use. An end 14a of the strap 14 (shown in FIG. 2A) exiting the space between the inner and outer surfaces of the side member 20b of the gripping portion 20 is attached by a stitch pattern 24 to another portion of the strap 14, thereby connecting the sleeve portion 18 to the strap 14.

Figure 3:
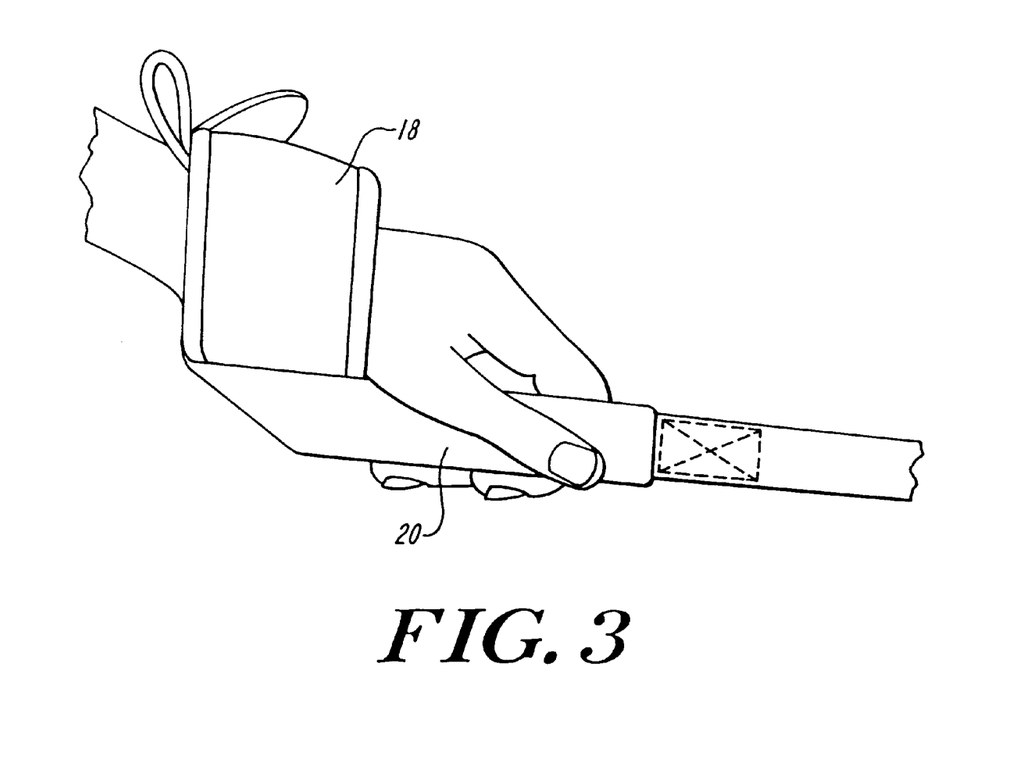
FIG. 3 is a side view of the sleeve portion of FIG. 2 having a loop portion forming a cuff around a pet handler's wrist, and handler's hand holding the gripping portion of the sleeve portion in accordance with the teachings of the present invention.

Referring to FIG. 2B, the illustrated sleeve portion 12 includes a fastener 26, such as a snap-in button, positioned in a portion of the sleeve portion 12 intermediate the loop portion 18 and the gripping portion 20. Fastening the fastener 26 forms a wrist cuff from the loop portion 18, as shown in FIG. 3. Those skilled in the art will understand that the fastener 26 is not limited to a snap-in button, and can be instead a clip, Velcro, or any other fastener that can be easily fastened and unfastened. With the loop portion 18 snugly fitted around the pet handler's wrist, the handler can hold the gripping portion 20 in the palm of the hand to restrain the animal or pet attached to the leash.

Figure 4A:
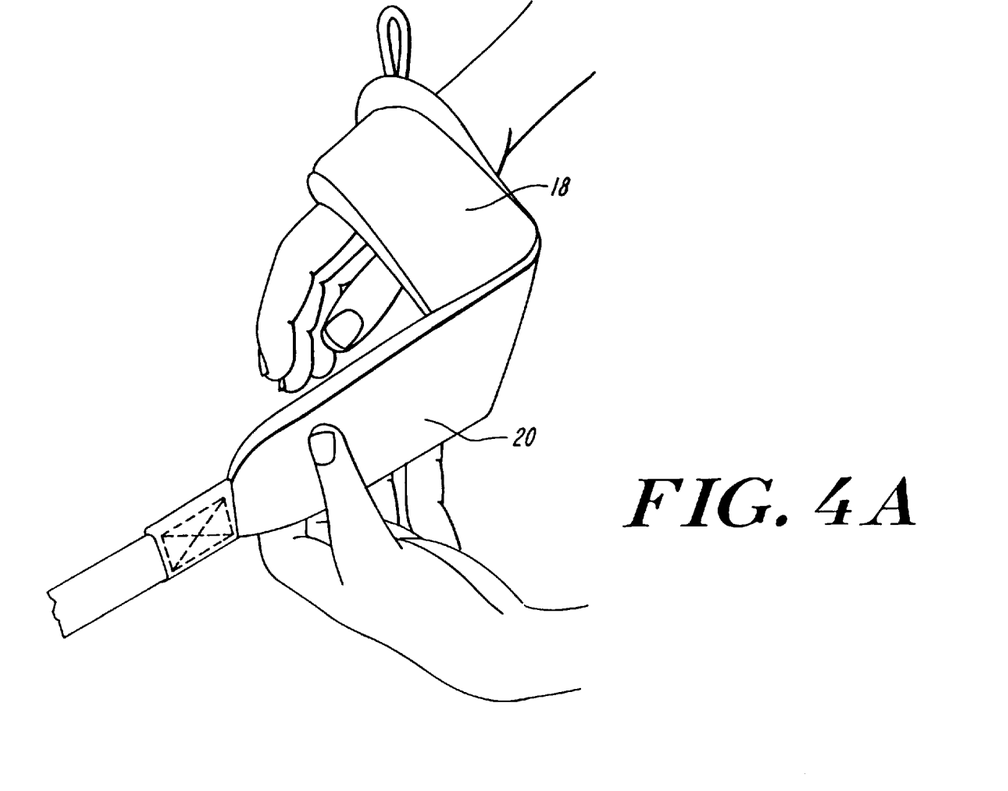
FIG. 4A is another perspective view of the leash of FIG. 3, illustrating a method for placing the wrist cuff of the sleeve around the handler's wrist.
Figure 4B:
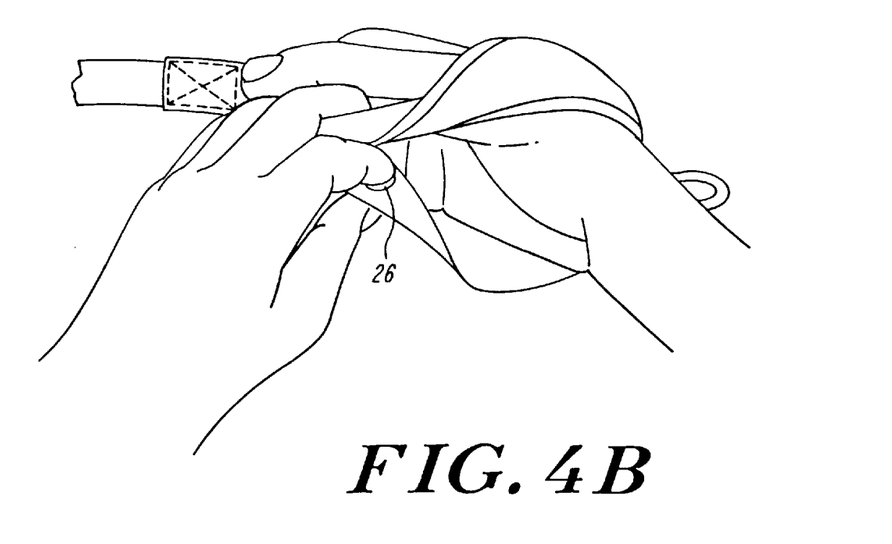
FIG. 4B is another perspective view of the leash of FIG. 3 illustrating an alternate method for wearing the sleeve portion of the leash of FIG. 3.

One advantage of the leash of the present invention is that it can be easily worn. In particular, FIG. 4A illustrates that a wrist cuff formed from the loop portion 18 can be slipped over the pet handler's hand to seat about the wrist. If the handler's hand is too large to fit through the wrist cuff, the fastener 26 can be unfastened to provide more room for slipping the loop portion 18 over the handler's hand to place it around the wrist. Once the loop portion 18 is around the handler's wrist, the fastener 26 can be fastened to form a cuff snugly fitted around the wrist.

With reference to FIGS. 2A, 2B, and 3, another advantage of the illustrated leash 10 is that the inner surface 18c of the loop portion 18 lying against the wrist of a pet handler is formed of a soft fabric-like material, such as Velour. As a result, the loop portion 18 can be fitted snugly and comfortably against the handler's wrist, for example by fastening the fastener 26, without creating unwanted stress or abrasions on the handler's skin, or unnecessarily restricting blood flow to the handler's hand. Further, as mentioned above, the outer surfaces of the side members 20a and 20b of the gripping portion 20 are also formed of the soft fabric-like material, and hence do not dig into the pet handler's hand as the handler exerts pressure on the gripping portion 20 to control a pet attached to the leash. Further, a foam-like material disposed between the inner and outer surfaces of the loop portion and of the gripping portion advantageously provides cushion for snug fitting of the wrist cuff, formed of the loop portion 18, around an handler's wrist and to form a comfortable gripping surface on the gripping portion 20.

Figure 5:
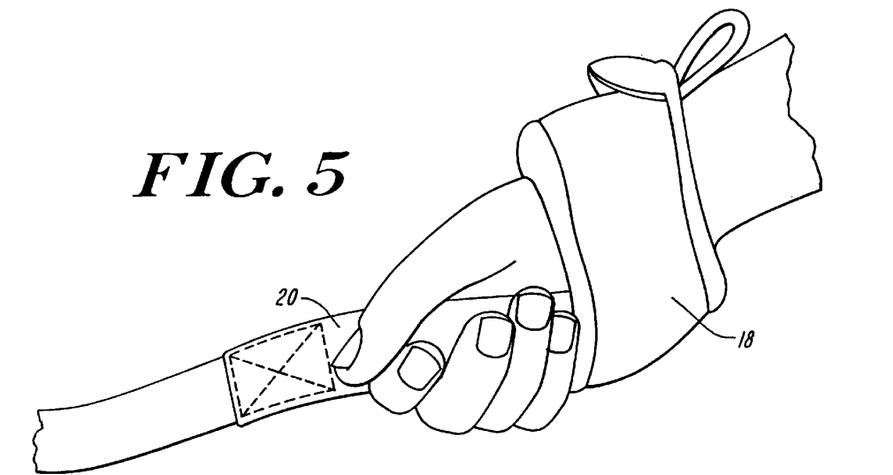
FIG. 5 is a perspective view illustrating that a pet handler using a leash according to the present invention can tightly hold the gripping portion of the leash while the loop portion forms a cuff around the handler's wrist without substantial bending of the handler's hand relative to the wrist.

With reference to FIGS. 2A and 5, another advantage of the illustrated leash 10 is that the angle 18e between the loop portion 18 and the gripping portion 20 is chosen such that a pet handler using the leash 10 can easily hold the gripping portion 20 with the loop portion 18 forming a cuff around the wrist. That is, as shown in FIG. 5, the pet handler does not need to bend the hand with respect to the wrist in order to hold properly and comfortably the gripping portion 20. This holding configuration transfers the load on the leash to the entire arm of the pet handler, thus minimizing the strain on the handler's wrist and arm, while concomitantly allowing for a more comfortable leash holding posture compared with conventional leashes.

Figure 6:
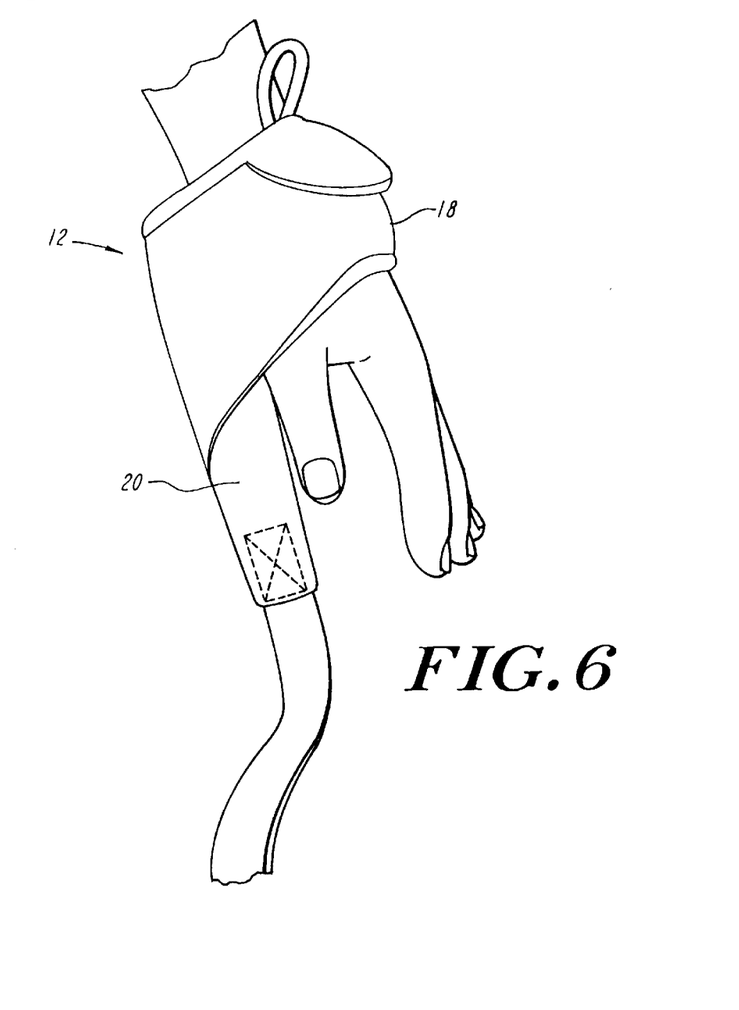
FIG. 6 illustrates the sleeve portion of the leash of the present invention being placed on a pet handler's wrist by a user in a relaxed position.

Further, as shown in FIG. 6, the leash 10 advantageously allows a pet handler wearing the sleeve portion 12 to walk in a relaxed or a rest position, i.e., with the arm extending straight down, without a need to hold the gripping portion 20. In such a position, the wrist cuff formed from the loop portion 18 rests against the upper portion of the handler's hand, and hence keeps the leash attached to the handler. At any time, the handler can simply grab the gripping portion 20 to exert pressure on the leash. For example, if a pet that is attached to the leash 10 and is being walked by its handler in a relaxed position starts running away from the handler, the handler can simply grab the gripping portion 20 to restrain the pet.

Figure 7A:
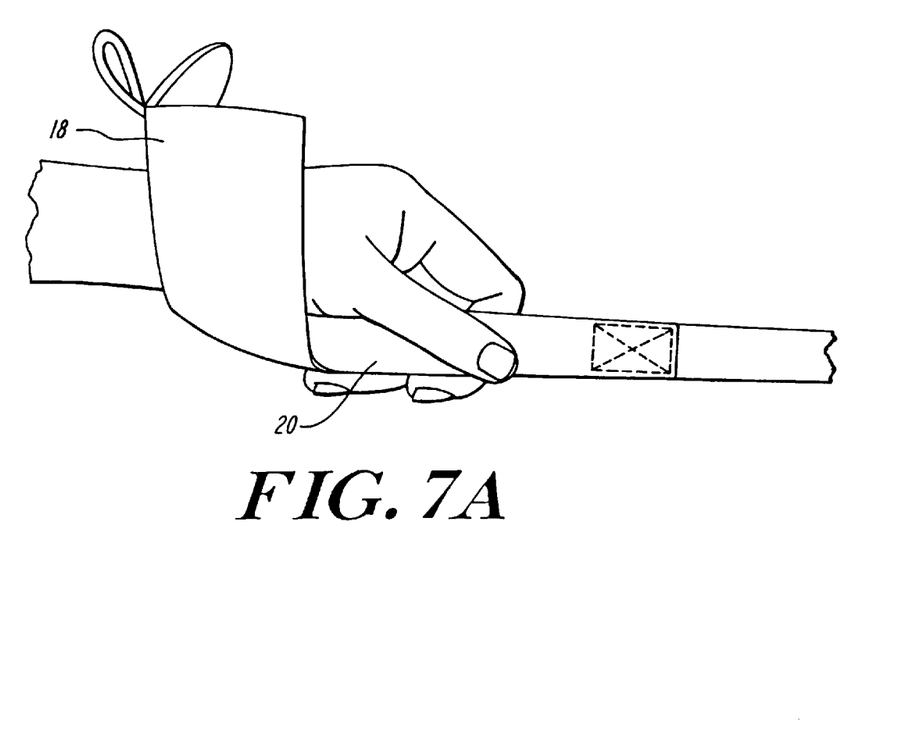
FIG. 7A is a side view of the sleeve portion of the leash of the present invention illustrating that a pet handler wearing the sleeve portion can hold the gripping portion tightly to restrain the pet attached to the leash.
Figure 7B:
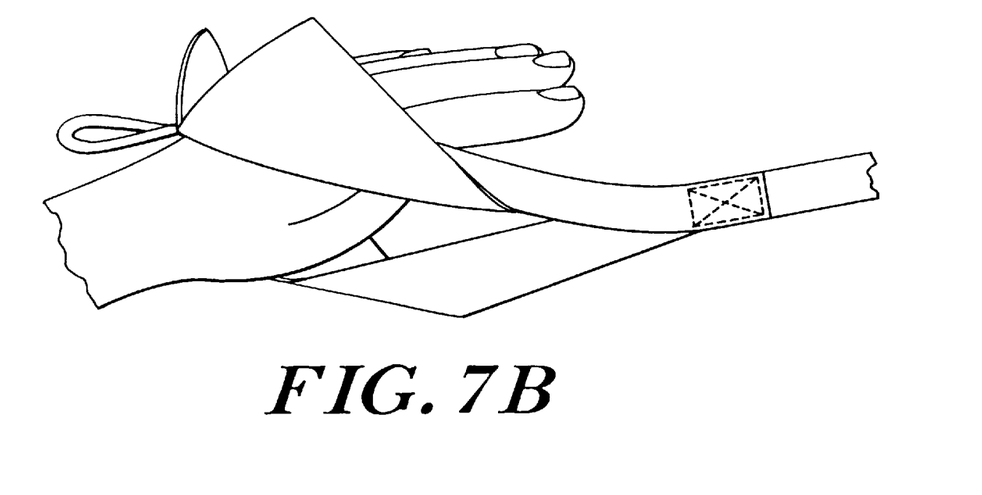
FIG. 7B is another perspective view of the sleeve portion of the leash of FIG. 7A, illustrating that a pet handler can choose to release the leash by releasing the gripping portion and collapsing the hand to snap open the fastener forming a wrist cuff from the loop portion of the sleeve portion.

In certain situations, a pet handler may wish to easily and quickly release a leash to which the pet is attached. For example, a person walking a pet may wish to release the leash if the pet starts pulling hard on the leash, to avoid potential back injuries. A preferred embodiment of the invention provides a mechanism for such a quick and easy release of the leash. In particular, reference to FIGS. 2A, 2B, 7A, and 7B shows that the snap-in button 26 for forming a wrist cuff from the loop portion 18 can provide a mechanism for easy and quick release of the leash 10. FIG. 7A illustrates the sleeve portion 12 of the leash 10, with the ends 18a and 18b of loop portion forming a cuff around the pet handler's wrist. The handler is holding the gripping portion tightly to control and/or restrain a pet (not shown) attached to the leash. If the pet starts pulling hard on the leash, the handler has a choice of exerting more pressure on the gripping portion 20 to restrain the pet. Alternatively, the handler can simply release her hold on the gripping portion 20 and collapse the hand to snap open the button 26, thereby releasing the leash, as shown in FIG. 7B.

In an alternative embodiment of the invention, a permanent wrist cuff is formed from the loop portion 18, for example by stitching two ends of the loop portion 18 together. Such an embodiment may be desirable to avoid accidental release of the leash.

Figure 8A:
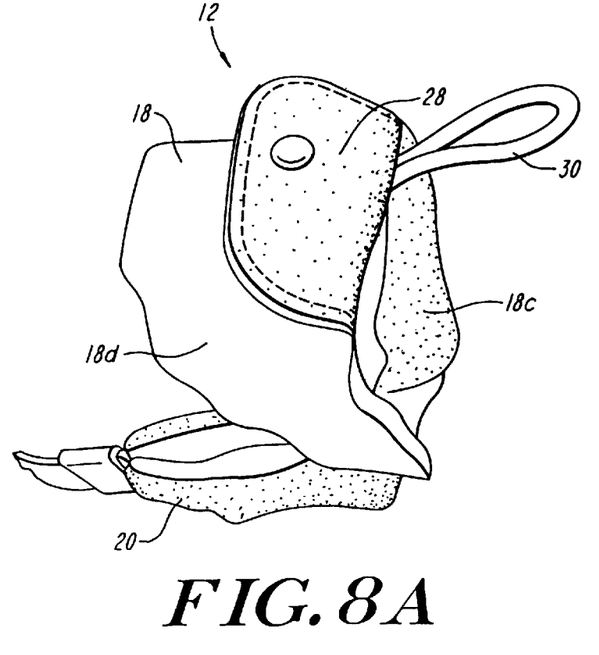
FIG. 8A is a perspective view of the sleeve portion of a leash of the invention illustrating that the leash can optionally include a pocket and a hanging loop.
Figure 8B:
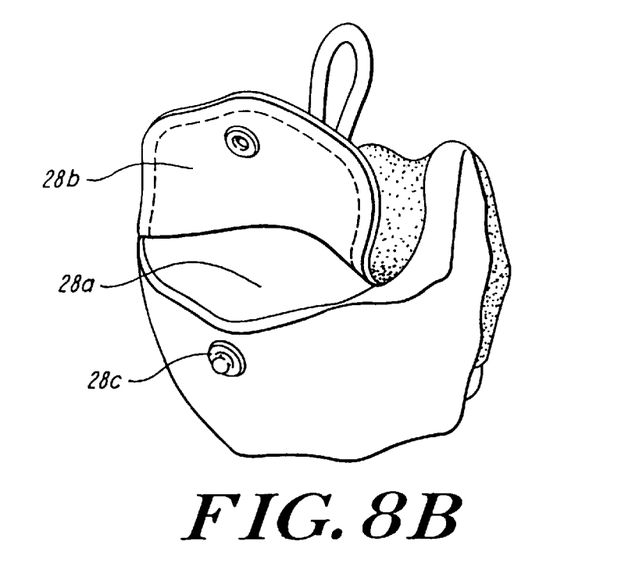
FIG. 8B is a perspective view of the back of the sleeve portion of the leash of FIG. 8A illustrating that the pocket includes a flap.

Referring to FIGS. 8A and 8B, the sleeve portion 12 can optionally include a pocket 28 for carrying small items such as money, dog biscuits, keys, plastic bags, etc. The pocket 28 includes an enclosure 28a formed between the inner surface 18c and the outer surface 18d of the loop portion 18. A flap 28b having a fastener 28c, such as a snap button, can close the enclosure 28a. The pocket 28 is positioned such that it is located on the upper portion of a handler's wrist when the loop portion 18 forms a cuff around the handler's wrist. Thus, the handler can easily access the pocket 28.

Further, as shown in FIG. 8A, the illustrated sleeve portion 12 can optionally include a hanging loop 30 that allows convenient storage of the leash 10, for example by hanging it on a hook.

Figure 9A:
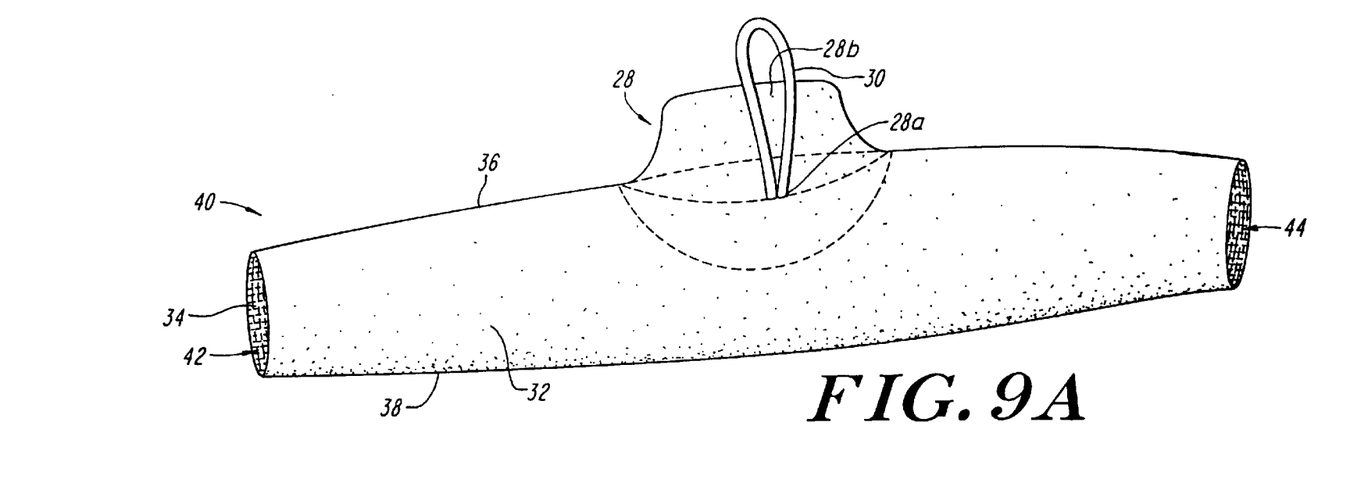
FIG. 9A illustrates a tubular-like structure formed from two surfaces in an initial step in a preferred method for manufacturing a leash according to the present invention.

FIGS. 9A–9E show a preferred method of manufacturing the leash 10 according to the present invention. In a first step, as shown in FIG. 9A, a surface 32, formed of a soft fabric-like material, such as Velour or felt, and a surface 34, formed of Nylon or twill, or denim, or leather, or duck fabric, are stitched together along the portions 36 and 38 to form a tubular-like structure 40 having openings 42 and 44 at its two ends. The stitching is done such that an enclosure 28a is formed between a portion of the two surfaces 32 and 34, and a flap 28b is sewn around a portion of the perimeter of the enclosure 28a, thereby creating a pocket 28. In addition, a hanging loop 30, formed for example of a woven or braided material, is sewn to the tubular-like structure 40.

Figure 9B:
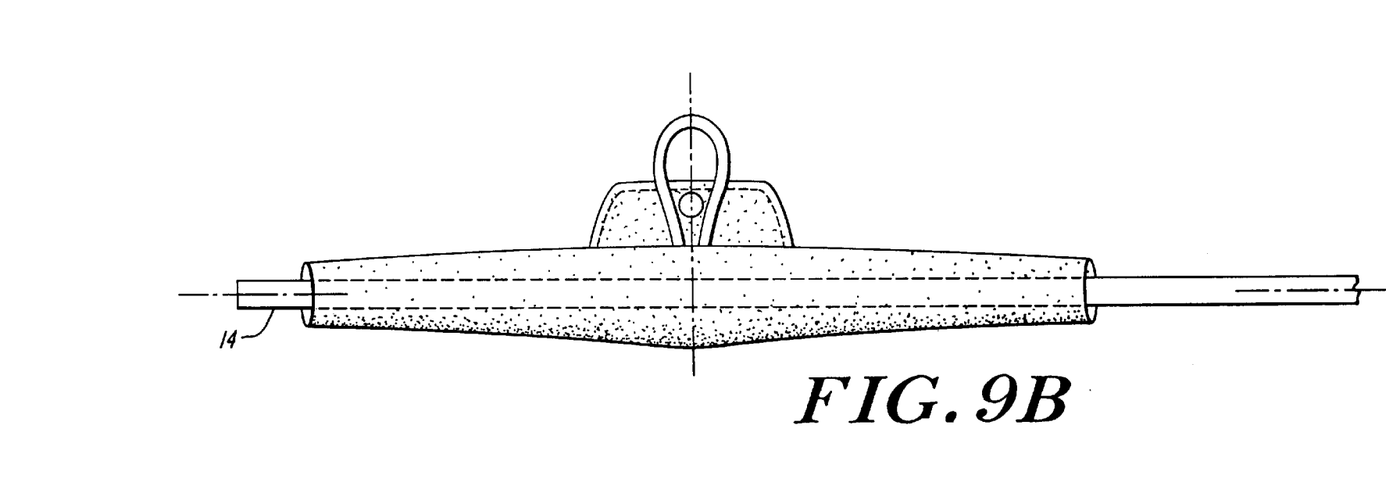
FIG. 9B illustrates the tubular-like structure of FIG. 9A with an elongate flexible strap disposed within the tubular-like structure.
Figure 9C:
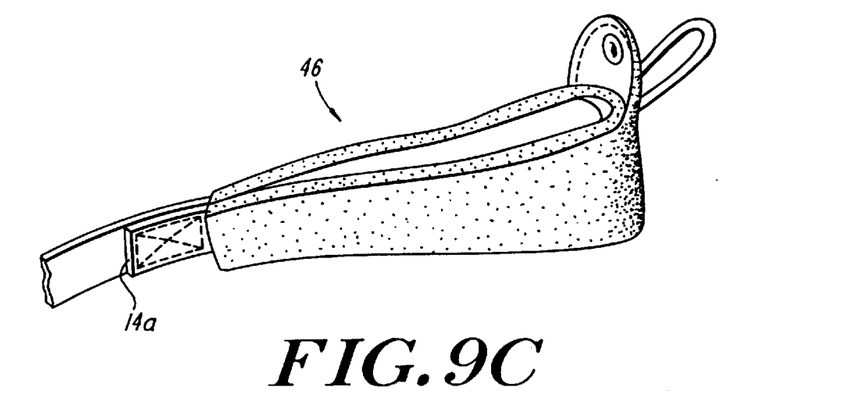
FIG. 9C illustrates the tubular-like structure of FIG. 9B folded, and two portions of the strap stitched together to form a loop.

Subsequently, as shown in FIG. 9B, an elongate flexible strap 14 is inserted through the openings 42 and 44 in the space within the tubular-like structure 40 between the surfaces 32 and 34. The tubular-like structure 40 is folded to put the openings 42 and 44 adjacent to each other, as shown in FIG. 9C. A portion 14a of the strap 14 exiting the opening 44 is stitched to a portion of the strap proximate the opening 42 and opposite to the portion 14a, to form a loop 46.

Figure 9D:
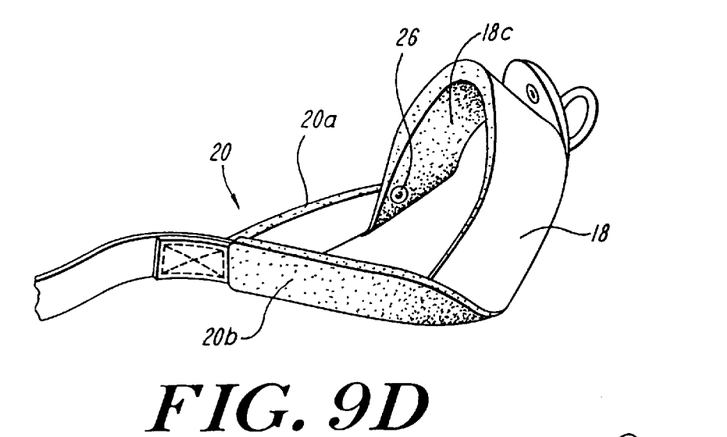
FIG. 9D illustrates a sleeve portion of a leash according to the invention created by folding a portion of the loop of FIG. 9C to form a sleeve portion having a loop portion and a gripping portion formed of two side members.

Subsequently, a portion of the loop 46 is folded with respect to the rest of the loop 46, to produce the loop portion 18 and the members 20a and 20b of the gripping portion 20, as shown in FIG. 9D. The side member 20b of the gripping portion 20 has an outer surface 20c that is contiguous with the inner surface 18c (FIG. 9D) of the loop portion 18, and has an inner surface (not seen), opposite its outer surface, that is contiguous with the inner surface of the loop portion 18. Similarly, the inner and outer surfaces of the member 20a are contiguous with the outer and inner surfaces of the loop portion 18, respectively.

Figure 9E:
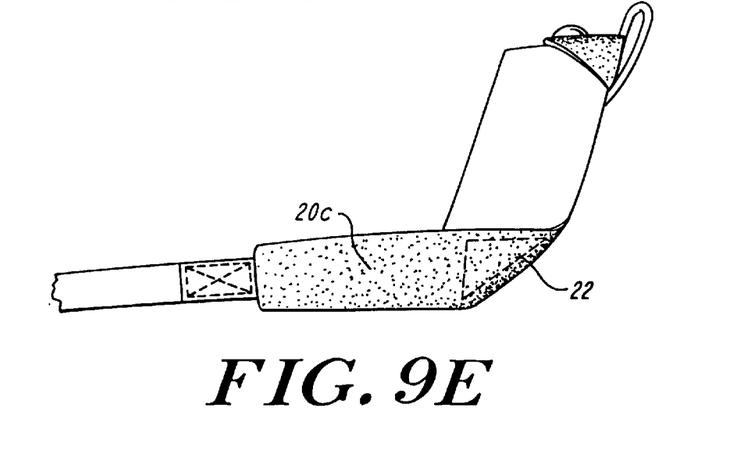
FIG. 9E illustrates the sleeve portion of FIG. 9D and one of two stitch patterns that ensure that the side members of the gripping portion retain their structures.

Two stitching patterns, one of which 22 is shown in FIG. 9E, ensure that the side members 20a and 20b of the gripping portion 20 retain their structures, i.e., the stitch patterns prevent unfolding of the members 20a and 20b relative to the loop portion 18.

Figure 10A:
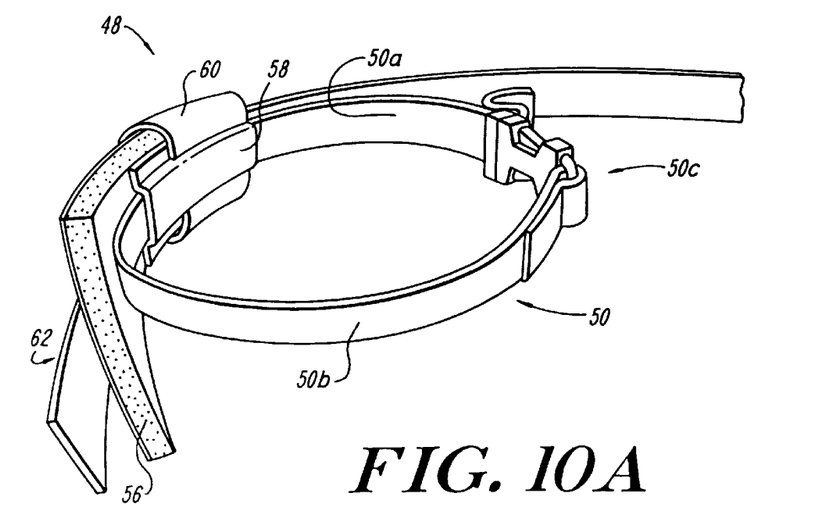
FIG. 10A is a perspective view of a collar according to invention with a portion of the load-carrying member not depicted.
Figure 10B:
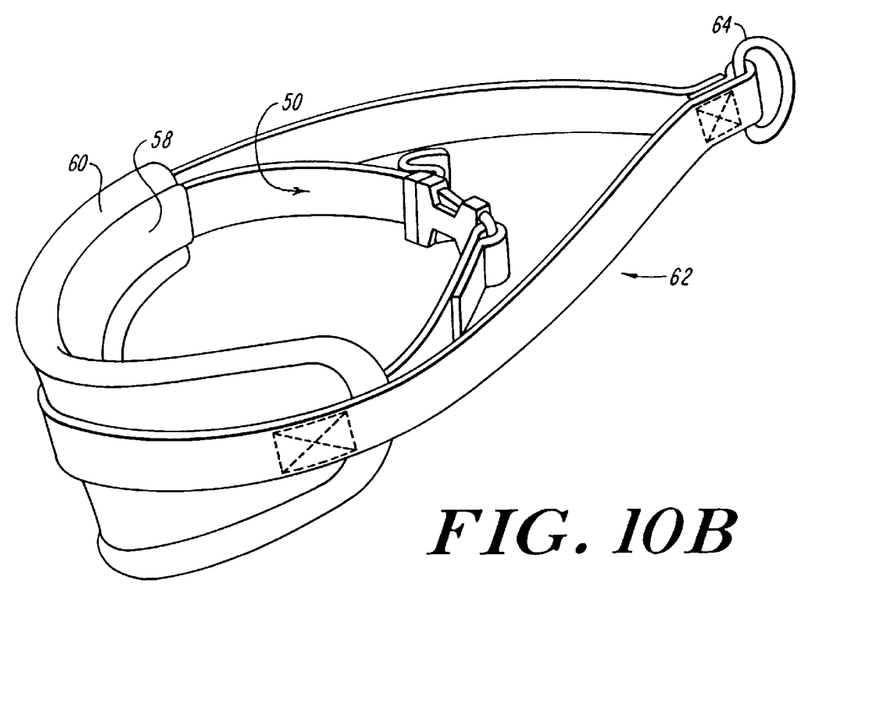
FIG. 10B is another view of the collar of FIG. 10A illustrating the load-carrying member forming a loop about the inner collar portion.

Another aspect of the present invention relates to a collar 48, FIG. 10A and 10B, that can be attached to the distal end of the lead member 14 of the leash 10, and which is placed about a pet to secure the pet to the leash 10. FIG. 10A illustrates that the collar 48 includes a substantially circular inner collar portion 50, preferably formed of Nylon webbing. The inner collar portion 50 includes an inner surface 50a and an outer surface 50b, and is sized and dimensioned to be placed about the pet, for example about the pet's neck. The inner collar portion 50 further includes an adjustable buckle 50c that allows the size of the inner collar portion 50 to be adjusted for a given pet. Once the size of the inner collar portion 50 is adjusted, it can be conveniently secured to the pet or detached from the pet by simply fastening or unfastening the adjustable buckle 50c.

Figure 11:
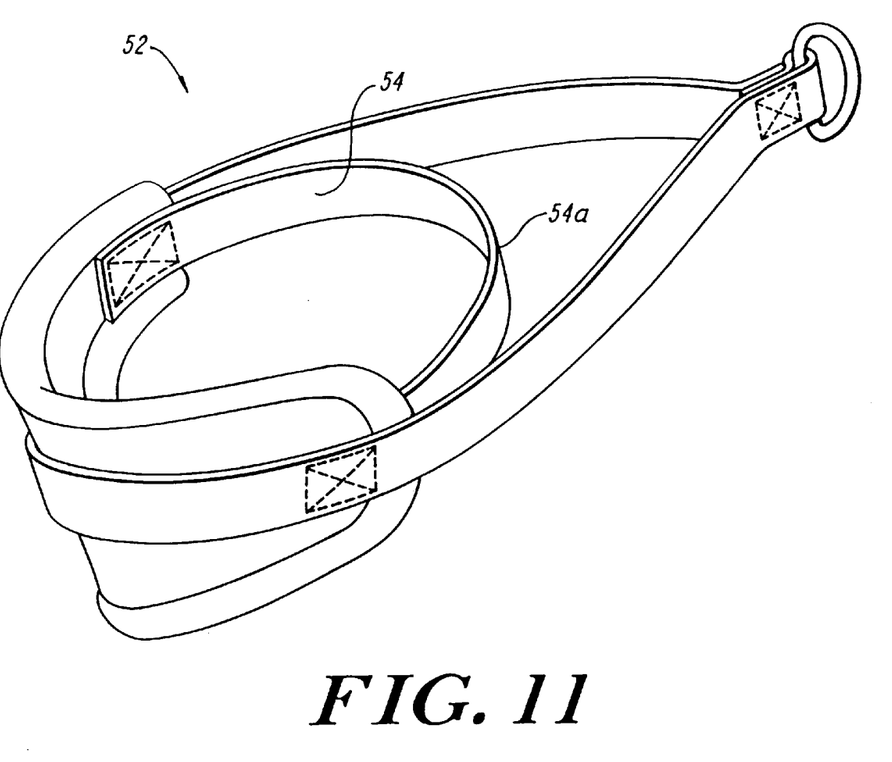
FIG. 11 is a perspective view of a collar according to the invention alternative to the collar shown in FIGS. 10A and 10B.

FIG. 11 illustrates an alternative collar 52 according to the present invention having an inner collar portion 54. An expandable elastic strap 54a replaces the adjustable buckle 50c of the collar 48 of FIG. 10A. The elastic strap 54a allows expanding the size of the inner collar portion 54 to be slipped over the pet's head and placed about the pet's neck. Further, the elastic strap 54a provides a snug fit of the inner collar portion 54 about the pet after placing the inner collar portion 54 about the pet.

Referring again to FIGS. 10A and 10B, the collar 48 further includes a padding portion 54, formed from a foam-like material such as Neoprene, that is placed around a portion of the outer surface 50b of the inner collar portion 50. An inner fabric portion 58, formed for example from Nylon or cotton, is secured to the padding portion 56, for example by stitching, and overlies the inner surface 50a of the inner collar portion 50. Upon placing the inner collar portion 50 about the pet, the inner fabric portion 58 contacts the pet's skin and produces a frictional force that prevents the inner collar portion 50 from rotating about the neck.

An outer finishing fabric 50 covers the edges of the padding portion 56. An outer load-carrying member 62, formed for example of Nylon webbing, is secured to the padding portion 56, for example by stitching, and is further secured to a hook 64 that can be attached to a clip at the distal end of the lead member 14 of the leash 10 (FIG. 1). To secure the collar 48 to a pet, the buckle 50c is unfastened, and the inner collar portion 50 is slipped over the pet's head to be placed about the pet. Subsequently, the buckle 50c is fastened to provide a snug fit of the inner collar portion 50 about the neck and reduces the force on the pet's trachea. The outer load-carrying member 62 transfers the force exerted by the pet's handler on the leash to the padding portion 56. The padding member 56 is selected to be wide enough, for example approximately 3 inches wide, so that it will distribute the load transferred from the outer load-carrying member 62 substantially evenly about the pet. Further, the foam-like material of which the padding member 56 is formed has a spring-back quality that cushions the force from the outer load-carrying member 62, and thus minimizes strain on the pet.

While the present invention has been described with reference to above illustrative embodiments, those skilled in the art will appreciate that various changes in form and detail may be made without departing from the intended scope of the present invention as defined in the appended claims.

What is claimed is:

1. A leash configured for attachment to a collar disposed about an animal to restrain the animal, said leash comprising
   a sleeve portion sized and dimensioned for mounting about the wrist of a handler of the animal, the sleeve portion having a loop portion at least partially formed of a soft fabric-like material, and a gripping portion sized and dimensioned for seating in the palm of the handler when gripped, the gripping portion being formed at least partially of said soft fabric-like material, said gripping portion being integral with said loop portion,
   an elongate lead member having a proximal end and a distal end, said elongate member being attached to the gripping portion, and
   attachment means connected to the distal end of said lead member and configured for coupling to the collar disposed about the animal.

2. The leash of claim 1, wherein said loop portion forms an oblique angle with said gripping portion.

3. The leash of claim 2, wherein said oblique angle lies in the range from between about 90 degrees to about 135 degrees.

4. The leash of claim 3, wherein said oblique angle is about 105 degrees.

5. The leash of claim 1, wherein said soft fabric-like material is selected from the group consisting of Velour, felt, suede, fleece, and brushed tricot.

6. The leash of claim 1, wherein said loop portion and said gripping portion form a single unitary piece.

7. The leash of claim 1, further including a fastener positioned in a portion of said sleeve intermediate said loop portion and said gripping portion for forming a wrist cuff from said loop portion when fastened.

8. The leash of claim 7, wherein said fastener comprises a snap-in button.

9. The leash of claim 7, wherein said fastener comprises Velcro.

10. The leash of claim 7, wherein said fastener comprises an elastic connector.

11. The leash of claim 1, wherein said loop portion comprises an inner surface joined to an outer surface to create a tubular-like structure.

12. The leash of claim 11, wherein said inner surface is formed of said soft fabric-like material.

13. The leash of claim 11, wherein said outer surface is formed of a synthetic material.

14. The leash of claim 11, wherein said outer surface is formed of material selected from the group consisting of Nylon, twill, denim, leather, and duck fabric.

15. The leash of claim 11, wherein said lead member is partially disposed between said inner surface and said outer surface.

16. The leash of claim 11, further including a foam-like material disposed between said inner surface and said outer surface of said loop portion.

17. The leash of claim 16, wherein said foam-like material comprises heavy polyester felting.

18. The leash of claim 1, wherein said gripping portion includes two side members, each member formed of an outer surface joined to an inner surface to create a tubular-like structure.

19. The leash of claim 18, wherein said outer surface of said each side member of said gripping portion is formed of said soft fabric-like material.

20. The leash of claim 18, wherein said inner surface of said each side member of said gripping portion is formed of a synthetic material.

21. The leash of claim 18, wherein said lead member is partially disposed between said inner surface and said outer surface.

22. The leash of claim 18, further including a foam-like material disposed between said inner surface and said outer surface of said each side member of said gripping portion.

23. The leash of claim 1, wherein said lead member comprises a flexible strap.

24. The leash of claim 23, wherein said flexible strap is formed of a material selected from the group consisting of woven Nylon, cotton, and leather.

25. The leash of claim 23, wherein said lead member comprises a metal chain.

26. The leash of claim 1, wherein said attachment means comprises a clip.

27. A leash configured for attachment to a collar disposed about an animal to restrain the animal, said leash comprising
   a sleeve portion sized and dimensioned for mounting about the wrist of a handler having a loop portion formed of an outer surface of Nylon attached to an inner surface of Velour to create a tubular-like structure, and a gripping portion forming a single unitary unit with said loop portion and formed of two members, each of said members of the gripping portion being formed of an inner surface of Nylon and an outer surface of Velour to create a tubular-like structure, said gripping portion being sized and dimensioned for seating in the palm of the user when gripped,
   an elongate flexible strap formed of woven Nylon having a proximal end and distal end, said strap having a loop at its proximal end disposed between said inner and outer surfaces of said loop portion and of said members of said gripping portion,
   attachment means connected to the distal end of said flexible strap and configured for coupling to the collar disposed about the animal.

28. A handle for a leash configured for attachment to a collar disposed about an animal, said handle comprising
   a sleeve portion sized and dimensioned for mounting about the wrist of a user having a loop portion at least partially formed of a soft fabric-like material, and a gripping portion sized and dimensioned for seating in the palm of the user when gripped and at least partially formed of said soft fabric-like material, said gripping portion being integral with said loop portion.

29. The handle of claim 28, wherein said loop portion forms an oblique angle with said gripping portion.

30. The handle of claim 29, wherein said oblique angle lies in the range from between about 90 degrees to about 135 degrees.

31. The handle of claim 30, wherein said oblique angle is about 105 degrees.

32. The handle of claim 28, wherein said soft fabric-like material is selected from the group consisting of Velour, suede, fleece, felt, and brushed tricot.

33. The handle of claim 28, wherein said loop portion and said gripping portion form a single unitary piece.

34. The handle of claim 28, further including a fastener positioned in a portion of said sleeve intermediate said loop portion and said gripping portion for forming a wrist cuff from said loop portion when fastened.

35. The handle of claim 34, wherein said fastener comprises a snap-in button.

36. The handle of claim 34, wherein said fastener comprises Velcro.

37. A collar for disposing about an animal and configured for attachment to a leash, comprising a substantially circular inner collar portion sized and dimensioned to be disposed about the animal, said inner collar portion having an inner surface and an outer surface and having an adjustable buckle, a padding portion having an inner surface and an outer surface, said padding portion being positioned about the outer surface of said inner collar portion, an inner fabric portion secured to said padding portion and covering at least partially the inner surface of said inner collar portion, a load-carrying member secured to the outer surface of said padding portion and configured to form a loop about said inner collar portion, said load-carrying member being configured for attachment to a leash to transfer a force exerted on the leash to said inner collar portion.

38. The collar of claim 37, further comprising an outer fabric portion covering edges of said padding portion.

* * * * *